Sept. 3, 1935.  H. E. WELLCOME  2,013,120
LUBRICATING SYSTEM
Filed Nov. 24, 1933   2 Sheets-Sheet 1
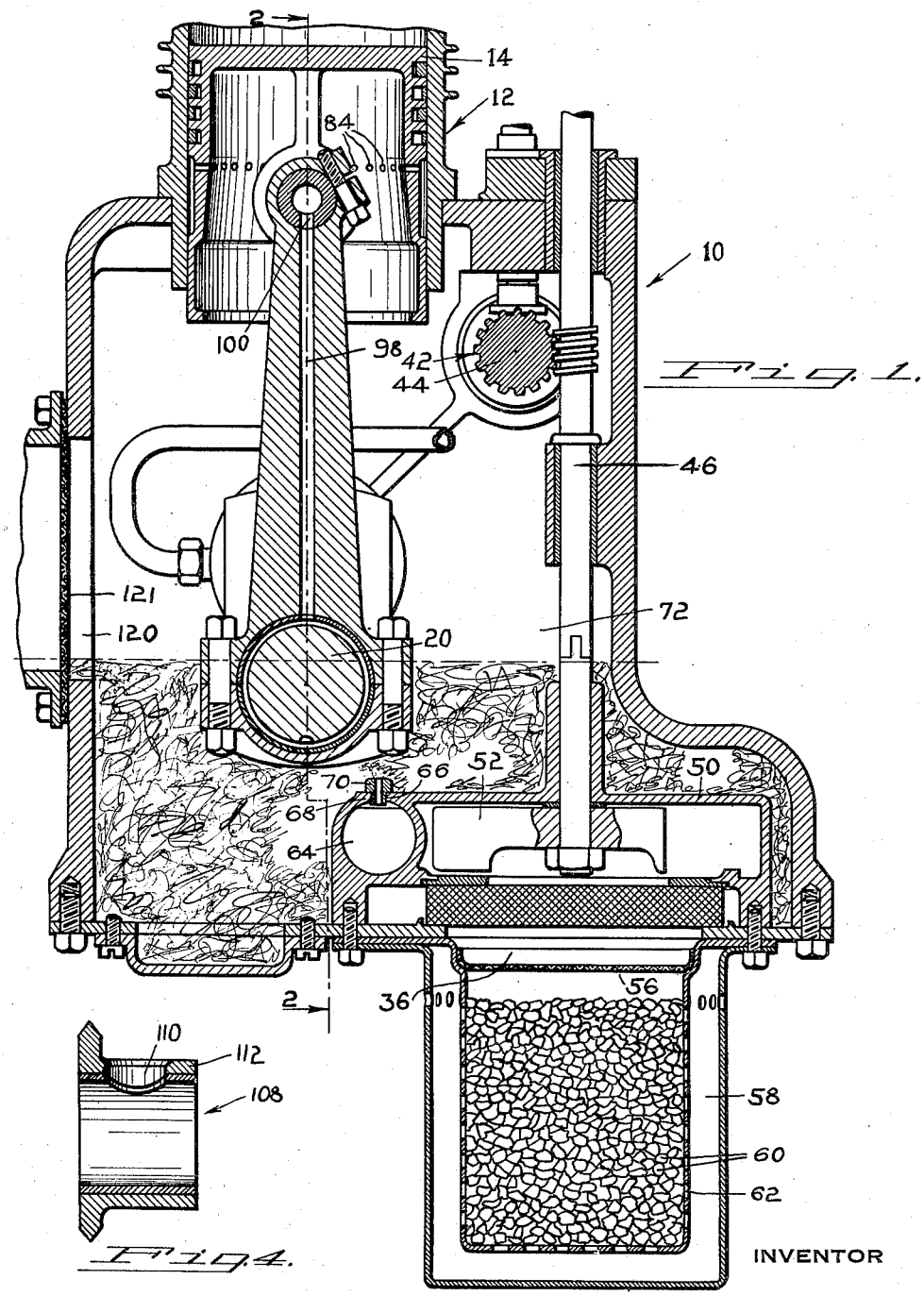
INVENTOR
BY HUBERT E. WELLCOME.
ATTORNEY

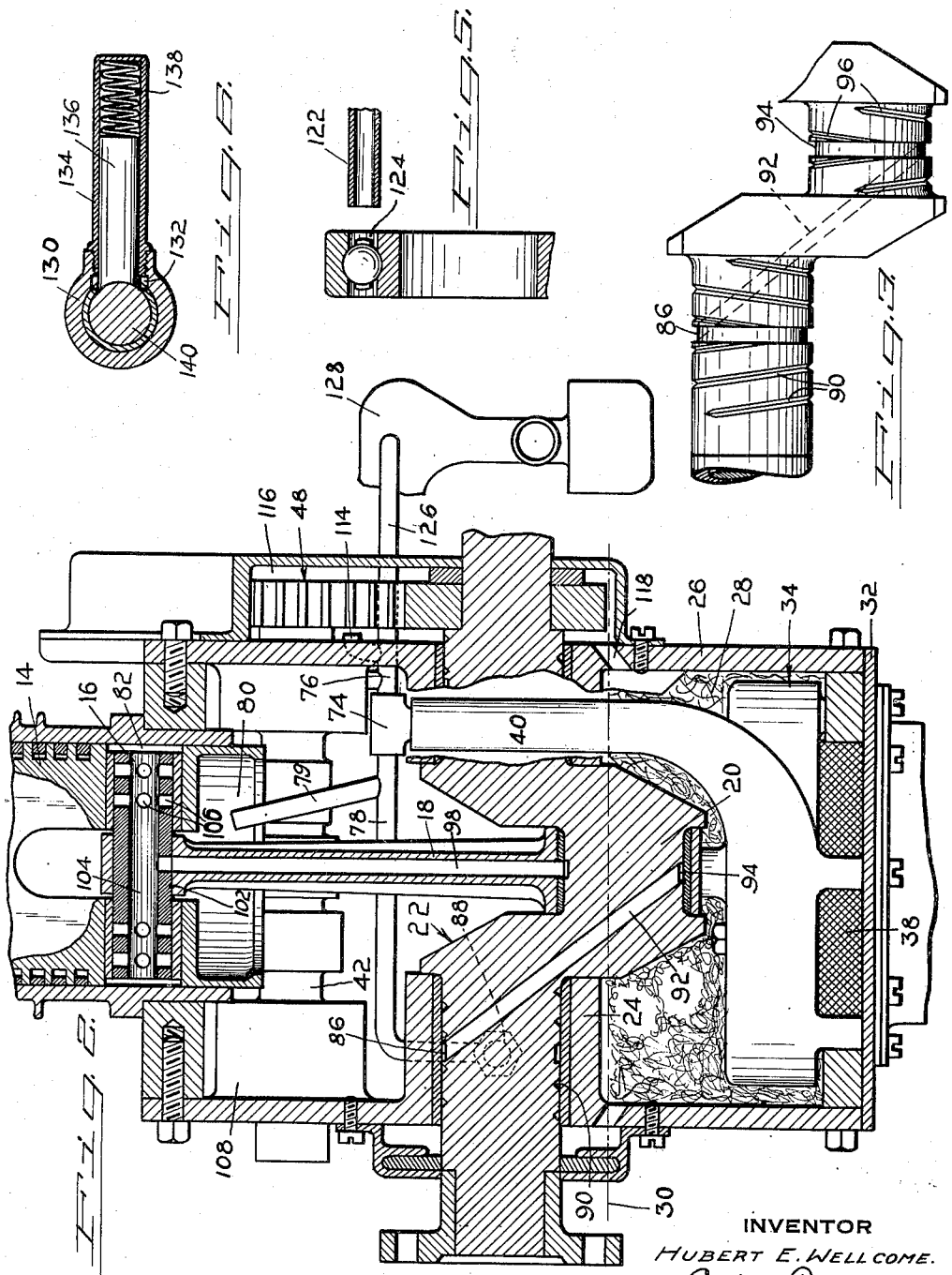

Patented Sept. 3, 1935

2,013,120

UNITED STATES PATENT OFFICE 2,013,120

LUBRICATING SYSTEM

Hubert E. Wellcome, Chappaqua, N. Y., assignor of one-half to Florence K. Wellcome, Chappaqua, N. Y.

Application November 24, 1933, Serial No. 699,521

19 Claims. (Cl. 184—6)

This invention relates to lubricating systems, and to a process of lubrication.

The invention here to be described is especially adapted for the lubrication of internal combustion engines, with their problems of elements moving at high speeds and involving high temperatures, both generated by friction and by the power element of the engine. Graphite has been well-known as lubricant, but such use apparently has extended only to applications in positions where it can be applied directly by hand, or, in some cases, to applications in a form where it is carried emulsified in substances such as oil. Suggestions have been made, in a few instances that graphite be fed to parts to be lubricated by carrying it in a pneumatic stream to such parts. Only in the systems involving direct application has there been any measure of success, illustrating a lack of desirability, utility, and operativeness in any of the others.

Graphite, being a solid, cannot be pumped as are the ordinary liquid lubricants. However, when brought between two contacting surfaces, it distributes itself readily, and quickly fills up all the minute crevices found in such surfaces. Thereafter it interposes an extraordinarily smooth, friction-reducing and heat-eliminating element between the surfaces. Also its use does not involve the smoke-forming characteristics of oil lubricants. Nor does it leak from lines as does oil. Actual consumption of the material is very small. Yet, on continuous relative movement of such surfaces, the graphite will be squeezed out of and discharged from between the contacting surfaces, and unless replenishment is continuous, serious damage to the parts might finally result.

It is an object of the invention to provide a system of lubrication in which the material used for producing the friction-reducing elements between moving surfaces is a solid in dry condition and dispersed into small particles. Graphite, preferably in flake form, is the material which answers most admirably to the requirements of this invention. For the purposes of the invention, the graphite is supplied in dry condition, and for certain purposes, is so maintained continuously throughout the operation of the apparatus. By the invention, the supply of such lubricating material to parts to be lubricated is continuously replenished simply and efficiently.

In this system, as especially arranged for use in internal combustion engines as now generally in use, a reservoir for a large quantity of the solid lubricant, in flake form, is provided by the crankcase of the engine. Into this reservoir is dumped a quantity of the flake graphite up to a level above the lowest point to which the crank-pin and the lower end of the connecting rod will travel. It is the purpose of the invention to lubricate certain parts of the apparatus by directing to those parts a pneumatic stream in which are entrained particles of the graphite. For producing this pneumatic stream and entraining the particles, it is an object of the invention to provide suitable apparatus. It is an object of the invention to utilize gravity in accomplishing certain functions in the system to be described, as, for instance, the feeding of the graphitous material to such apparatus as is utilized for entraining the particles in the pneumatic stream, for taking care of excess lubricant exuded by and not taking effect upon parts to be lubricated, and for many other like purposes.

For certain of these purposes, there may be positioned on the bottom of the crank-case a device to be fed by gravity from the storage of flake graphite. Such a device, which may be in the form of a blower, may function by drawing at least a portion of its inlet air through the stored material in the crank-case. The device may then discharge the particles, entrained in the resultant pneumatic stream, into suitable conduits, to be then directed to or blasted against such parts of the apparatus to be lubricated.

Vital portions of an engine construction, such as here dealt with, are, of course, the co-acting cylinder and piston surfaces. Lubrication for these surfaces may be provided, at least in part, by an air-blast of entrained particles directed at the piston, and into the hollow portion thereof. For this purpose, the piston may be provided, at its cylinder-engaging surface, with an annular channel with which communicate suitable openings directed from the hollow of the piston. The air-blast, with its entrained particles, directed into the hollow, will thus be enabled to guide the graphitous material into lubricating relation to the relatively moving surfaces of piston and cylinder. At the same time, the air-blast may function for cooling the heated surfaces of the engine. During continuous operation, an excess of such particles will be delivered; those which do not become effective between the surfaces, or as may thereafter travel beyond or be squeezed from between the surfaces, will precipitate back into and mix with the other stored material in the crank-case.

It is an object of the invention to provide a method for lubricating, with such a pneumatic stream of entrained particles, bearing points of the crank-shaft, and such other relatively moving parts of an engine, and especially those housed within, or within portions directly communicating with, the crank-case. Especial consideration is directed to the lubrication of the relatively moving surfaces of the crank-shaft and its bearings. The lubricant for the bearing may be delivered through a passage therein, placed in communication with a conduit leading from the blast-producing member. Within the confines of the bearing, there may be provided a circumferential groove, communicating with the passage. Leading from the circumferential groove may be one or more gutters, winding around between bearing and shaft, and leading away from the circumferential groove. Such gutters may substantially define helices. The direction in which the helices are wound will be related to the direction of rotation of the shaft in the bearings, and to the direction of the pneumatic stream at the inlet, so that entrained particles within such grooves and helices will be propelled to move gradually from the grooves, then through the helices, and finally beyond the bearings, then to be precipitated back into the storage.

A passage may be provided, extending through the crank-shaft from the position of the circumferential groove at the bearings to the crank-pin and the connecting rod bearing therewith associated. The crank-pin may have a similar groove cooperating with the passage from the bearing. Helical gutters may likewise lead away from the groove at the entrant end of the connecting passage. Thus, lubrication for the crank-pin is provided, the connecting passage providing continuous accessibility for the entraining stream from the blast-producing device.

To lubricate the piston bearings, the connecting rod may be bored lengthwise, continuously from the crank-pin bearing to the bearing at the wrist-pin. The construction may be such that, at least once in every revolution, this bore will be placed in direct communication with the passage from bearing to wrist-pin, and so may conduct graphite to the wrist-pin and its bearings. The wrist-pin, made hollow, opens at the cylinder surface as well as through a plurality of openings to deliver graphite into the bearings of the wrist-pin on connecting rod and in the piston. In this manner, the wrist-pin bearings may be lubricated simultaneously with the delivery of lubricant to the cylinder and piston surfaces.

The timing gears for the engine, as well as other elements located within the housing provided by the crankcase, may be lubricated by a cloud of graphite produced by action such as the pounding of the crank-pins in the graphitous material stored in the crank-case. Such cloud may be increased by blast jets derived from the blower, in any suitable manner. An individual duct may lead to the timing gears from the blast-producing device, a return passage providing communication between the timing gear casing and the crank-case to return to the crank-case any excess of material not used.

Moving parts, such as the cam shafts, which move relatively slowly, and, therefore, require no considerable lubrication may derive their lubrication from means such as openings in the tops of the bearings for such parts. Into such openings, there will precipitate, from the cloud in the crank-case, sufficient material to perform the necessary lubricating functions. The system provides for direct, continuous, and automatic lubrication of members such as ball-bearings, where a blast is directed immediately at the race portion of the bearing.

A factor requiring some consideration in the operation of apparatus of this character is moisture. Dry graphite does not cake to any substantial degree. However, with the introduction of a small amount of moisture, there arises a tendency to cake, a condition which may not be desirable for certain purposes involved in complete and effective operation of apparatus in accordance with this invention. It is an object of the invention to provide means for avoiding the effect of moisture in the operation of such apparatus and in carrying out such process. Air-drying means may be arranged in association with the apparatus, and preferably in association with the intake of the blower for the purpose of extracting from any air brought into the crank-case from the atmosphere, such moisture as it may be carrying. Moisture which may get into the crank-case from other sources may be taken care of by this dry air constantly pumped into the crank-case, and discharged therefrom in this manner. However, outlets from the crank-case may also be sealed by suitable means to prevent moisture passing back into that chamber from the atmosphere. Otherwise, the crank-case may be made air-tight.

For the lubrication of small parts, such as valve stems and so forth, graphite may be introduced into the explosive mixture derived from the carburetor, either immediately at the carburetor, or in the inlet manifold, by connecting to either of these elements a conduit leading from the blast-producing device.

In the case of parts to be lubricated, but not accessible for operation thereon of the blast devices, as, for instance, in the case of grease cups and so forth, the graphite may be prepared in stick form, placed in a casing, and, by a suitable propelling device, driven against the shaft to be lubricated. As this stick is worn away by the shaft, the latter will derive sufficient lubricant for proper operation.

Other objects of this invention will hereinafter be set forth, or will be apparent from the description and the drawings, in which are illustrated embodiments of applications of the invention.

The invention, however, is not intended to be restricted to any particular construction or arrangement of parts, or to any particular application of such construction, or to any specific method of operation, or manner of use, or to any of the various details thereof herein shown and described, as the same may be modified in various particulars, or be applied in many varied relations, without departing from the spirit and scope of the claimed invention, the embodiments herein illustrated and described being merely some of various forms and modifications in which the invention might be embodied.

On the drawings, in which the same reference characters refer to the same parts throughout, and in which there is disclosed the application of the invention in various phases:

Fig. 1 is a vertical sectional view through a portion of an internal combustion engine with which has been associated apparatus embodying certain of the principles of the invention, parts of the apparatus being shown in elevation, and other parts being broken away, to simplify the disclosure;

Fig. 2 is a vertical sectional view, substantially as seen from line 2—2 of Fig. 1, parts being shown in elevation, and other parts being diagrammatically illustrated;

Fig. 3 is an elevational view of a section of the crank-shaft, illustrating details of its construction;

Fig. 4 is a longitudinal vertical cross-sectional view of a detail of the construction;

Fig. 5 is a sectional view, illustrating an arrangement for lubricating ball bearings; and Fig. 6 is a sectional view of a detail, illustrating the lubrication of shafts by stick graphite.

On the drawings, there has been illustrated an internal combustion engine 10, and, for simplicity, the engine is shown as being of the single cylinder type, having a single cylinder 12. In the cylinder moves a piston 14, carrying, by a wrist-pin 16, a connecting rod 18 which extends to a crank-pin 20 of a crank-shaft 22. The crank-shaft, carried in suitable bearings 24 of any preferred construction, with its crank-pins, connecting rods and other parts of the engine, are housed within a crank-case 26. For purposes of this invention, this crank-case is made a storage for a quantity of graphitous material 28, which may be piled into the crank-case until a level, defined by line 30, has been reached, that is, a level above the lower dead-center position of the connecting rod.

Spaced slightly from the bottom 32 of the crank-case there may be disposed a blast-producing device, here shown in the form of a centrifugal blower 34. This blower may be provided with two air inlets. Inlet 36 may communicate with the atmosphere, and a screened inlet 38 may open into the crank-case. Leading away from the blower is an upright outlet 40 from which ducts are directed to various parts to be lubricated by the apparatus. Driving means for the blower may take any desired form. In this case, a cam shaft 42, for driving devices in the usual manner, in apparatus of this character, may also have a set of gears 44 by means of which shaft 46 of the blower may be impelled. Cam shaft 42 may also deliver power to timing gears 48.

The level of the graphite in the crank-case is higher than the blower, and, therefore, casing 50 of the blower is completely covered, the level of the material being above the lowest point to which the crank-pin and connecting rod will move, when rotated. In this manner, the graphitous material may be fed to the blower entirely by gravity.

The casing for the blower may be of any suitable type to house blades 52, here shown as being disposed to rotate about a vertical axis. Inlet 38, to which this graphitous material is fed by gravity, is disposed at one side of the casing, and has a screen. The mesh of the screen may be varied to determine the rapidity of feeding of the material to the blower. If desired, a movable baffle may be positioned with relation to this screen in order to adjust the amount of material so to be fed. This adjustment may, on the other hand, be effected at inlet 36, further to be described. Any suitable means may be used for the purpose of facilitating feeding at screened inlet 38. The vibration of the apparatus itself may be sufficient for this purpose.

On inlet 36, through which atmospheric air is fed to the blower, there may be disposed a screen 56 with which may be associated a baffle, as, for instance, for sliding relatively in varying the effective opening provided thereby. The air, passing this screen, is guided into a chamber 58. In this chamber is retained, in any suitable manner, a charge of moisture-absorbing material 60. In one application of the invention, calcium chloride was found serviceable for the purposes desired. This material is retained in a cage 62, perforated or formed with foraminations. Through material and cage the air passes, and after having been dried by material 60, the air passes on to blower 34.

The air from both inlets 36 and 38 is mixed within the blower with the particles which have been entrained as the air moved through inlet 36. This pneumatic stream is then discharged into conduit 64 for delivery to those parts of the apparatus which are to be lubricated. An opening 66 in the wall 68 of conduit 64 may be provided with a nozzle 70 so that the air-stream may, at least in small part, be discharged up through the stored mass of graphite, and thus produce a cloud within the chamber 72 provided by the crank-case.

The remainder of the pneumatic stream will pass up through outlet 40. In this case, outlet 40 is shown to terminate in a T-connection 74 from which lead away a number of conduits 76 and 78. A branch 79 of conduit 78 may be directed up into the hollow 80 of piston 14. Annularly formed in the surface of the piston may be a channel 82, forming, with the cylinder walls as the piston moves, a chamber into which, through suitable passages 84, may be delivered graphite from the stream issuing from the conduit. Any excess particles not so delivered will precipitate back into the stored mass.

Bearing 24 for the crank-shaft, or, as in this case shown, the crank-shaft itself, is formed with a circumferential groove 86. The latter construction was found desirable as centrifugal force tends to throw graphite out of the grooves in the shaft and against the bearings. Immediately at this groove in the bearing there is provided a passage 88 to which is connected conduit 78. Leading away from groove 86 are a plurality of channels or gutters 90, shown to have a helical formation. In this case, channels 90 lead from groove 86 in both lateral directions, but are wrapped around the shaft in substantially the same direction. The fact is that, on rotation of the shaft with respect to the bearings, and on discharge of graphite through passage 84 into groove 86, such graphite will be worked along the channels, completely lubricating the contiguous surfaces of shaft and bearing.

Drilled through the shaft from groove 86 to the surface of the crank-pin, is a passage 92, opening at the crank-pin in a circumferential groove 94. At the crank-pin there are provided channels 96, having substantially the same formation as grooves 90, and functioning in substantially the same manner when graphite is delivered through passage 92 to circumferential groove 94.

Connecting rod 18 may have a passage 98 extending completely through its entire length, this passage communicating with groove 94 on the crank-pin, and, at predetermined intervals, coming into communication with an opening 100 through the bearing 102 of wrist-pin 16. When passage 92 is moved into proper relationship, graphite particles will be discharged into groove 94, then through passage 98 and opening 100, into the wrist-pin which, in this case, is formed hollow for the purposes to be stated.

Leading from chamber 104, formed in the hollow wrist-pin, are a plurality of openings 106 through which graphite may be worked into the contacting surfaces of bearing 102 and the piston. Also excess graphite will be discharged into channel 82 with which the hollow wrist-pin communicates. In this manner, lubrication of the moving parts of the piston-connecting-rod-crank-shaft assembly is provided.

Cam shaft 42, carried in bearings 108, does not have the stresses and frictional forces applied thereto that are present in the other moving parts just described. For that reason, such parts as bearing 108 may be provided with an opening 110 in its top wall 112. From the cloud of material in the crank-case, there will be precipitated into opening 110, sufficient material for the lubrication of the shaft in its bearings.

Timing gears 48 may also rely upon the cloud for such lubrication as may be desired. However, where desired, a branch 114 may lead from conduit 76 to discharge into auxiliary casing 116, in which the timing gears are housed. Excess lubricant will pass from casing 116 through a bottom passage 118 and then back into the storage.

Excess air may pass from the crank-case through a suitable vent or vents 120, which may be protected by air-drying devices similar to that associated with the inlet from the atmosphere. A screening member 21 may be disposed in connection with such vent to assure retention of graphite particles against dissipation to the atmosphere as the excess air is vented.

As shown in Fig. 5, ball bearings may be lubricated by directing a stream from a branch conduit 122 at race 124 so that the particles of graphite will come directly into contact with the balls of the bearings themselves. For the lubrication of small valve parts, another branch 126 may lead into inlet manifold 128 for the injection, into the explosive mixture fed to the cylinder, of a small quantity of graphite particles. This line may be valved, as the requirement for such lubrication is not in any great quantity, and need not be continuous.

For lubrication of other parts, customarily reached by grease cups, such as a bearing 130, a threaded opening 132 may receive a casing 134 in which a stick of graphite 136, preferably bound by some binding material, is positioned. By means of a follower and a spring 138, this stick will then be propelled against shaft 140. As the shaft rotates, sufficient of this graphitous material will be worn away to provide for the lubrication of that moving member.

Many other changes could be effected in the particular apparatus designed, and in the methods of operation set forth, and in specific details thereof, without substantially departing from the invention intended to be defined in the claims, the specific description being merely to illustrate operative embodiments capable of carrying out the spirit of the invention.

What is claimed as new and useful is:—

1. In an internal combustion engine, a crank-case for the engine, the crank-case providing a storage space for a lubricating material in solid but dispersed form, and means for propelling particles of the dispersed lubricating material in a gaseous carrier from the storage space to portions of the apparatus to be lubricated, the means being located within the crank-case, and unused particles of lubricating material precipitating into the storage.

2. In an internal combustion engine, a crank-case for the engine, the crank-case providing a storage space for a lubricating material in solid but dispersed form, and means located at the lower portion of the crank-case for propelling particles of the dispersed lubricating material in a gaseous carrier from the storage space to portions of the apparatus to be lubricated so that unused particles precipitate into the storage.

3. In an internal combustion engine, a crank-case for the engine, the crank-case providing a storage space for a lubricating material in solid but dispersed form, and means located at the lower portion of the crank-case and substantially imbedded in the store of lubricating material therein, the means being effective for propelling particles of the dispersed lubricating material in a gaseous carrier from the storage space to portions of the apparatus to be lubricated so that unused particles precipitate into the storage.

4. In an internal combustion engine, a crank-case for the engine, the crank-case providing a storage space for a graphitous material in dispersed form, and means for propelling particles of the dispersed graphitous material in an air stream from the storage space to portions of the apparatus to be lubricated so that unused particles precipitate into the storage.

5. In an internal combustion engine, a crank-case for the engine, the crank-case providing a storage space for flake graphite, and means located at the lower portions of the crank-case and substantially imbedded in the store of flake graphite, the means being effective for entraining particles of the flake graphite from the storage space in a pneumatic stream directed to portions of the apparatus to be lubricated so that unused particles precipitate into the storage.

6. In an internal combustion engine, a crank-case for the engine, the crank-case providing a storage space for flake graphite, and means for entraining particles of the flake graphite from the storage space in a pneumatic stream directed to portions of the apparatus to be lubricated, the means being located within the crank-case, and unused particles of flake graphite precipitating into the storage.

7. In an internal combustion engine, a crank-case for the engine, the crank-case providing a storage space for flake graphite, means for entraining particles of the flake graphite from the storage space in a pneumatic stream, and means to conduct the stream and the entrained particles to portions of the apparatus to be lubricated so that unused particles precipitate back into the storage.

8. In an internal combustion engine, a crank-case for the engine, the crank-case providing a storage space for flake graphite, means for entraining particles of the flake graphite from the storage space in a pneumatic stream, and a blast device opening within the crank-case to project the stream and the entrained particles against portions of the apparatus to be lubricated.

9. In an internal combustion engine, a crank-case for the engine, the crank-case providing a storage space for flake graphite, and means for directing a pneumatic stream upwardly through the mass of stored particles of the flake graphite to cause movement of the particles and to form a cloud of the particles thus moved, portions of the apparatus being lubricated by the cloud and unused particles precipitating into the storage.

10. In an internal combustion engine, the engine including a crank-case, a cylinder, and a piston within the cylinder, the crank-case providing a storage space for flake graphite; means for entraining particles of the flake graphite from the storage space in a pneumatic stream; and a blast device opening within the crank-case to project the stream and the entrained particles towards the cylinder and against the piston.

11. In an internal combustion engine, the engine including a crank-case, a cylinder, and a piston within the cylinder, the piston having a hollow portion, a circumferential channel in the cylinder engaging surface of the piston, and communicating passages between the hollow portion and the channel, the crank-case providing a storage space for flake graphite; means for entraining particles of the flake graphite from the storage space in a pneumatic stream; and a blast device opening within the crank-case to project the stream and the entrained particles against the cylinder and into the hollow portion of the piston.

12. A process of lubricating internal combustion engines, in which the storage of lubricant is constituted by the crank-case of the engine, and the lubricating material is graphite in dispersed form, including the steps of storing a mass of graphite in said crank-case, directing a pneumatic stream through the stored graphite to form a cloud of particles within the crank-case, and catching excess particles in the crank-case of the engine as they are discharged from the parts so subjected to the stream of particles.

13. A process of lubricating internal combustion engines, in which the storage of lubricant is constituted by the crank-case of the engine, and the lubricating material is graphite in dispersed form, including the steps of storing a mass of graphite in said crank-case, entraining in a pneumatic stream particles of graphite from said mass, conducting the stream to direct it against parts to be lubricated, and catching excess particles in the crank-case of the engine as they are discharged from the parts so subjected to the stream of particles.

14. In an internal combustion engine, the engine including a crank-case, and a crank-shaft, the crank-shaft being supported on bearings within the crank-case, and passages between the bearings and the crank-shaft, the crank-case providing a storage space for flake graphite; means for entraining particles of the flake graphite from the storage space in a pneumatic stream; and means to conduct the stream and the entrained particles to the crank-shaft bearings and into the passages.

15. In an internal combustion engine, the engine including a crank-case, and a crank-shaft, the crank-shaft being supported on bearings within the crank-case, each bearing having an opening therethrough, and helically grooved passages leading away from the opening between the bearings and the crank-shaft, the crank-case providing a storage space for flake graphite; means for entraining particles of the flake graphite from the storage space in a pneumatic stream; and means to conduct the stream and the entrained particles to the openings and into the passages.

16. In an internal combustion engine, the engine including a crank-case, and a crank-shaft, the crank-shaft being supported on bearings within the crank-case, each bearing having an opening therethrough, and helically grooved passages leading laterally away from the opening in both directions between the bearings and the crank-shaft, the crank-case providing a storage space for flake graphite; means for entraining particles of the flake graphite from the storage space in a pneumatic stream; and means to conduct the stream and the entrained particles to the openings and into the passages.

17. In an internal combustion engine, the engine including a crank-case, and a crank-shaft, the crank-shaft being supported on bearings within the crank-case, each bearing having an opening therethrough, a circumferential groove between bearing and crank-shaft and communicating with the opening, and helically grooved passages leading away between the bearings and the crank-shaft from the circumferential groove, the crank-case providing a storage space for flake graphite; means for entraining particles of the flake graphite from the storage space in a pneumatic stream; and means to conduct the stream and the entrained particles to the openings and into the passages.

18. In an internal combustion engine, the engine including a crank-case, and a crank-shaft, the crank-shaft being supported on bearings within the crank-case, each bearing having an opening therethrough, a circumferential groove between bearing and crank-shaft and communicating with the opening, a cylinder, a piston within the cylinder, a wrist-pin for the piston, a connecting rod between the wrist-pin and the crank-shaft, a groove between the connecting rod and the crank-shaft, and a passage connecting the grooves, and helically grooved passages between the bearings and the crank-shaft leading laterally away from the circumferential groove in both directions, the crank-case providing a storage space for flake graphite; means for entraining particles of the flake graphite from the storage space in a pneumatic stream; and means to conduct the stream and the entrained particles to the openings and into the passages.

19. In an internal combustion engine, the engine including a crank-case, and a crank-shaft for the engine, the crank-shaft being supported on bearings within the crank case, each bearing having an opening therethrough, a circumferential groove between bearing and crank-shaft and communicating with the opening, helically grooved passages between the bearings and the crank-shaft leading laterally away from the circumferential groove in both directions, a cylinder, a piston within the cylinder, a hollow wrist-pin for the piston, a crank-pin on the crank-shaft, a connecting rod between the wrist-pin and the crank-pin, a groove between the connecting rod and the crank-pin, a passage connecting the grooves, and a passage connecting the wrist-pin and the groove between connecting rod and crank-pin, the crank-case providing a storage space for flake graphite; means for entraining particles of the flake graphite from the storage space in a pneumatic stream; and means to conduct the stream and the entrained particles to the openings through the bearings and into the passages.

HUBERT E. WELLCOME.